Patented Nov. 9, 1926.

1,605,926

UNITED STATES PATENT OFFICE.

VIGGO DREWSEN, OF LARCHMONT, NEW YORK.

PROCESS OF TREATING SODIUM-MONOSULPHITE WASTE LIQUORS.

No Drawing.  Application filed April 3, 1922. Serial No. 549,196.

Other processes for treating sodium monosulphite waste liquors are described in my copending applications Nos. 549,195 and 549,198.

This invention relates particularly to processes of treating the sodium monosulphite ($Na_2SO_3$) waste cooking liquors which are produced in the digestion of straw, corn stalks, wood and other fibrous material for the production of paper pulp etc. so as to recover valuable inorganic constituents and prepare therefrom sodium monosulphite for reuse in the fibre digestion. The sodium monosulphite waste liquor from the digester, after being concentrated as in vacuum evaporators, is preferably incorporated with about twenty to thirty percent of its weight or ground limestone or other suitable calcium carbonate material, and the mixture burned or incinerated as in a rotary burner which evaporates the water and burns the organic material so that the sodium sulphide produced thereupon reacts to form insoluble calcium sulphide and soluble sodium carbonate which may be leached out of the mixture. The leached calcined material in finely divided form may be suspended in water and treated with carbon dioxide as in the form of rich kiln gases which combines with the calcium sulphide to form calcium carbonate and hydrogen sulphide gas which, if desired, may be reburned to form sulphur dioxide for making in any desired way sodium monosulphite for reuse in the cooking liquor.

The concentrated waste sodium monosulphite liquor containing fifty percent of water more or less may be mixed with about twenty-five percent of its weight of calcium carbonate in the form of ground limestone; or for instance, twenty to thirty percent or so of finely divided recovered calcium carbonate from this process, may be incorporated with the waste liquor in any usual manner as by feeding the carbonate in with a screw conveyor so that the powdery material falls with the concentrated waste liquor into the usual rotary burner for waste liquors. The high temperature within this rotary burner or black liquor incinerator, evaporates the water and decomposes the organic material so that sodium sulphide is produced which thereupon reacts with the calcium carbonate present, so as to form soluble sodium carbonate and insoluble calcium sulphide. The sodium carbonate thus produced may be leached out of the resulting black ash, or burner carbon, and the leached material, which may be ground if desired either before or after the leaching treatment, may be suspended in water and treated preferably under pressure with kiln gases which may be percolated up through the liquor. The carbon dioxide in these gases reacts with the calcium sulphide so as to form calcium carbonate and hydrogen sulphide, which may be reburned to form sulphur dioxide for combination with the sodium carbonate in the preparation of the sodium monosulphite cooking liquor in some cases. The calcium carbonate produced in this way may be used in finely divided or powdered form to incorporate with the sodium sulphite waste liquor before the incineration thereof. It is important to have a considerable excess of the calcium carbonate incorporated with the original waste liquor so as to be present and combine with any sulphur dioxide which may have evolved through the incineration, and also to form caustic lime which in slaking seems to break up any masses or large particles and promote the leaching out of the sodium carbonate.

This invention has been described in connection with a number of illustrative materials, proportions, conditions, arrangements, and orders of steps, to the details of which disclosure the invention is not of course to be limited, since what is claimed as new and what is desired to be secured by Letters Patent is set forth in the appended claims.

I claim:

1. The process of treating waste sodium monosulphite treating liquor produced in the digestion of vegetable fibrous material, which comprises combining with the concentrated treating liquor limestone to the extent of about twenty to thirty percent of its weight, concentrating and burning the mixture in the presence of air while agitating the same to form calcium sulphide and sodium carbonate, grinding and leaching the calcined material to remove the sodium carbonate therefrom, combining sulphur dioxide with the sodium carbonate to form sodium monosulphite, and treating the calcium sulphide while suspended in water with carbon dioxide to liberate hydrogen sulphide for use in producing sulphur dioxide.

2. The process of treating waste sodium monosulphite treating liquor produced in the digestion of vegetable fibrous material, which comprises combining with the concentrated treating liquor a chemical excess of finely divided calcium carbonate and burning the mixture to form calcium oxide, calcium sulphide and sodium carbonate, leaching the calcined material with water to remove sodium carbonate therefrom and promote the disintegration and leaching of the calcined material by the slaking of the calcium oxide therein, treating the calcium sulphide while suspended with carbon dioxide to liberate hydrogen sulphide for use in producing sulphur dioxide, and combining the sulphur dioxide with the sodium carbonate to form sodium monosulphite.

3. The process of treating waste sodium monosulphite treating liquor such as is produced in the digestion of vegetable fibrous material, which comprises combining with the concentrated treating liquor powdered calcium carbonate to the extent of at least about twenty percent of its weight and incinerating the mixture in the presence of air to form calcium sulphide and sodium carbonate, leaching the calcined material to remove sodium carbonate therefrom, treating the calcined sulphide with carbon dioxide to liberate hydrogen sulphide for use in producing sulphur dioxide.

4. The process of treating waste sodium monosulphite treating liquor such as is produced in the digestion of vegetable fibrous material, which comprises combining with the treating liquor calcium carbonate to the extent of at least about twenty percent of its weight and incinerating the mixture to form calcium sulphide and sodium carbonate, leaching the calcined material to remove sodium carbonate therefrom, treating the calcium sulphide to produce such sulphur dioxide.

VIGGO DREWSEN.